(12) United States Patent
Person et al.

(10) Patent No.: US 11,685,823 B2
(45) Date of Patent: Jun. 27, 2023

(54) CROSSLINKABLE POLYMERIC COMPOSITIONS WITH AMINE-FUNCTIONALIZED INTERPOLYMERS, METHODS FOR MAKING THE SAME, AND ARTICLES MADE THEREFROM

(71) Applicant: Dow Global Technologies LLC, Midland, MI (US)

(72) Inventors: Timothy J. Person, Pottstown, PA (US); Manish Talreja, Lansdale, PA (US); Jeffrey M. Cogen, Flemington, NJ (US); Saurav S. Sengupta, Gilbertsville, PA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 27 days.

(21) Appl. No.: 16/790,108

(22) Filed: Feb. 13, 2020

(65) Prior Publication Data

US 2020/0181375 A1 Jun. 11, 2020

Related U.S. Application Data

(63) Continuation of application No. 15/127,818, filed as application No. PCT/US2015/023987 on Apr. 2, 2015, now Pat. No. 10,619,034.

(60) Provisional application No. 61/992,338, filed on May 13, 2014.

(51) Int. Cl.

| | | |
|---|---|---|
| *C08L 23/06* | (2006.01) | |
| *C08L 23/04* | (2006.01) | |
| *C08F 210/02* | (2006.01) | |
| *B29B 7/72* | (2006.01) | |
| *B29B 7/00* | (2006.01) | |
| *B29B 7/84* | (2006.01) | |
| *C08K 5/00* | (2006.01) | |
| *C08L 23/26* | (2006.01) | |
| *B29B 7/90* | (2006.01) | |
| *C03C 25/285* | (2018.01) | |
| *C03C 25/30* | (2018.01) | |
| *D02G 3/12* | (2006.01) | |
| *D02G 3/36* | (2006.01) | |
| *D02G 3/44* | (2006.01) | |
| *B29B 7/38* | (2006.01) | |
| *H01B 3/44* | (2006.01) | |

(52) U.S. Cl.
CPC ............ *C08L 23/06* (2013.01); *B29B 7/007* (2013.01); *B29B 7/726* (2013.01); *B29B 7/728* (2013.01); *B29B 7/845* (2013.01); *B29B 7/90* (2013.01); *C03C 25/285* (2013.01); *C03C 25/30* (2013.01); *C08F 210/02* (2013.01); *C08K 5/005* (2013.01); *C08L 23/04* (2013.01); *C08L 23/26* (2013.01); *D02G 3/12* (2013.01); *D02G 3/36* (2013.01); *D02G 3/441* (2013.01); *H01B 3/441* (2013.01); *B29B 7/38* (2013.01); *C08L 2203/202* (2013.01); *C08L 2205/025* (2013.01); *C08L 2312/00* (2013.01); *D10B 2401/16* (2013.01)

(58) Field of Classification Search
CPC ...... C08L 23/26; C08L 23/0869; C08L 23/04; C08L 23/0892; C08L 23/06; C08L 23/0815; C08L 23/08; C08L 2203/202; C08L 2205/025; C08L 23/0807; C08L 23/083; C08L 23/0846; C08F 220/34; C08F 210/02; C08F 210/04; C03C 25/30; C09D 123/08; C09D 123/0807; C09D 123/0815; C09D 123/083; C09D 123/0892; D02G 3/12
USPC ............ 526/148, 156, 159, 172, 348, 348.1, 526/348.8; 174/110 PM, 110 R
See application file for complete search history.

(56) References Cited

U.S. PATENT DOCUMENTS

| | | | | |
|---|---|---|---|---|
| 3,798,289 | A * | 3/1974 | McGrath | ............. C08L 2666/02 525/186 |
| 5,418,272 | A * | 5/1995 | Kawabata | ............... C08L 23/06 428/461 |
| 6,656,986 | B2 | 12/2003 | Caronia et al. | |
| 8,579,269 | B2 | 11/2013 | Takakura | |
| 2001/0025083 | A1* | 9/2001 | Stark | ...................... C09J 201/06 525/222 |
| 2002/0169238 | A1 | 11/2002 | Caronia et al. | |
| 2012/0168982 | A1 | 7/2012 | Cho et al. | |
| 2013/0085241 | A1* | 4/2013 | Solis | ..................... C08F 210/02 526/64 |
| 2014/0137435 | A1 | 5/2014 | Yano | |
| 2018/0134864 | A1* | 5/2018 | Cao | ......................... C08K 3/04 |

FOREIGN PATENT DOCUMENTS

| | | | | |
|---|---|---|---|---|
| CA | 2321911 A1 * | 9/1999 | ............ | C08F 255/02 |
| CN | 101717542 | 6/2010 | | |
| EP | 0525585 B1 | 6/1998 | | |
| GB | 1032737 | 6/1966 | | |
| GB | 1221918 | 2/1971 | | |

(Continued)

OTHER PUBLICATIONS

Bryson, "In re Geisler," 116 F.3d 1465 (Fed. Cir. 1997), 1997, No. 96-1362.

(Continued)

*Primary Examiner* — Lee E Sanderson

(57) ABSTRACT

Crosslinkable polymeric compositions comprising an ethylene-based polymer, an organic peroxide, and an amine-functionalized interpolymer. Such crosslinkable polymeric compositions and their crosslinked forms can be employed as polymeric layers in wire and cable applications, such as insulation in power cables.

4 Claims, No Drawings

(56) References Cited

FOREIGN PATENT DOCUMENTS

| | | |
|---|---|---|
| JP | 2002505500 | 2/2002 |
| JP | 2004083622 | 3/2004 |
| JP | 2006348095 | 12/2006 |
| JP | 2008132846 | 6/2008 |
| JP | 2010155915 | 7/2010 |
| JP | 2012009663 | 1/2012 |
| JP | 2012525489 | 10/2012 |
| WO | 199944207 | 9/1999 |
| WO | 2012176677 | 12/2012 |
| WO | 2014051954 | 4/2014 |
| WO | 2015175106 | 11/2015 |

OTHER PUBLICATIONS

Cole, "Application of Aller," 220 F.2d 454 (C.C.PA. 1955), 1955, No. 6079.
Lourie, "In re Lance G. Peterson and Ioannis Vasatis," 315 F.3d 1325 (Fed. Cir. 2003), 2003, No. 02-1129.
Miller, "Application of Boesch," 617 F.2d 272 (C.C.PA. 1980), 1980, No. 79-597.
PCT/US2015/023987, International Search Report and Written Opinion dated Jun. 5, 2015.

\* cited by examiner

CROSSLINKABLE POLYMERIC COMPOSITIONS WITH AMINE-FUNCTIONALIZED INTERPOLYMERS, METHODS FOR MAKING THE SAME, AND ARTICLES MADE THEREFROM

REFERENCE TO RELATED APPLICATIONS

The present application claims the benefit of U.S. Provisional Application No. 61/992,338, filed on May 13, 2014.

FIELD

Various embodiments of the present invention relate to crosslinkable polymeric compositions comprising amine-functionalized interpolymers, methods of making the same, and articles made therefrom.

INTRODUCTION

Medium, high, and extra-high voltage ("MV," "HV," and "EHV") cables typically contain a crosslinked polymeric material as an insulation layer, such as a crosslinked polyethylene. Such crosslinked polymeric materials can be prepared from a crosslinkable polymeric composition having a peroxide initiator. The peroxides used as initiators for radical crosslinking in such materials can undergo non-productive decomposition during storage, particularly in the presence of an acid, thus reducing the cure potential of peroxide-containing crosslinkable compositions. Although advances have been achieved in the field of crosslinkable polymeric compositions, improvements are still desired.

SUMMARY

One embodiment is a crosslinkable polymeric composition, comprising:
(a) an ethylene-based polymer;
(b) an organic peroxide; and
(c) an amine-functionalized interpolymer having incorporated therein at least one type of amine-containing monomer.

Another embodiment is a crosslinkable polymeric composition, comprising:
(a) an ethylene-based amine-functionalized interpolymer; and
(b) an organic peroxide.

DETAILED DESCRIPTION

Various embodiments of the present invention concern crosslinkable polymeric compositions comprising an ethylene-based polymer, an organic peroxide, and an amine-functionalized interpolymer. In some embodiments, the ethylene-based polymer and the amine-functionalized interpolymer can be present as a single component (i.e., an ethylene-based amine-functionalized interpolymer). Additional embodiments concern crosslinked polymeric compositions prepared from such crosslinkable polymeric compositions. Further embodiments concern coated conductors and processes for producing coated conductors using the crosslinkable polymeric compositions.

Crosslinkable Polymeric Composition

As noted above, one component of the crosslinkable polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In various embodiments, the ethylene-based polymer can be an ethylene homopolymer. As used herein, "homopolymer" denotes a polymer consisting of repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94 g/cm³.

In various embodiments, the ethylene-based polymer is a high-pressure LDPE having a density of at least 0.915 g/cm³, but less than 0.94 g/cm³, or less than 0.93 g/cm³. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an 12 of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm³. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm³. VLDPEs suitable for use herein can have a melt index ($I_2$) ranging from 0.1 to 20 g/10 min., or from 0.3 to 5 g/10 min.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}$:1 to $10^{-1}$:1, or from $10^{-9}$:1 to $10^{-5}$:1.

An example of an ethylene-based polymer suitable for use herein is a high-pressure low-density polyethylene ("HP-LDPE"), which can have a density of 0.92 g/cc and a melt index of 2. Such HP-LDPEs are produced, for example, by The Dow Chemical Company, Midland, Mich., USA, and can be utilized in commercially available compounds for power cable insulation.

As noted above, the crosslinkable polymeric compositions described herein comprise an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, "hydrocarbyl" denotes a univalent group formed by removing a hydrogen atom from a hydrocarbon (e.g. ethyl, phenyl) optionally having one or more heteroatoms. As used herein, "hydrocarbylene" denotes a divalent group formed by removing two hydrogen atoms from a hydrocarbon optionally having one or more heteroatoms. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms and structure, or any two of R, $R^1$, and $R^2$ can have the same number of carbon atoms while the third has a different number of carbon atoms and structure.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)-3,3,5-trimethylcyclohexane; isopropylcumyl cumylperoxide; butyl 4,4-di(tert-butylperoxy) valerate; di(isopropylcumyl) peroxide; and mixtures of two or more thereof. In various embodiments, only a single type of organic peroxide is employed. In an embodiment, the organic peroxide is dicumyl peroxide.

As noted above, the crosslinkable polymeric composition further comprises an amine-functionalized interpolymer. Such amine-functionalized interpolymers comprise at least one type of amine-containing monomer. In various embodiments, the amine-functionalized interpolymer can be an interpolymer of one or more olefin-type monomers (e.g., α-olefin monomers) and at least one type of amine-containing monomer. In still other embodiments, the amine-functionalized interpolymer and the ethylene-based polymer can be a single interpolymer (i.e., an ethylene-based amine-functionalized interpolymer) comprising at least one type of amine-containing monomer.

Amine-containing monomers suitable for use in preparing the amine-functionalized interpolymer can be any monomer containing an amine group and having at least one point of unsaturation. Examples of such monomers include, but are not limited to, alkenyl amines (e.g., vinylamine, allylamine, etc.) and aminoacrylates. The amine group on the amine-containing monomer can be primary, secondary, tertiary, or mixtures thereof. In various embodiments, the amine group of the amine-containing monomer can be secondary or tertiary. When the amine group of the amine-containing monomer is secondary or tertiary, the substituents on the amine group can be hydrocarbyl groups (e.g., alkyl groups) having from 1 to 20 carbon atoms, from 1 to 10 carbon atoms, or from 1 to 6 carbon atoms, and can be branched, cyclic, or straight-chained, and saturated or unsaturated. Examples of suitable substituents on secondary or tertiary amine groups include, but are not limited to, methyl, ethyl, and t-butyl.

In various embodiments, the amine-containing monomer can be an aminoacrylate. Examples of suitable aminoacrylates include, but are not limited to, 2-(diethylamino)ethyl methacrylate, 2-(dimethylamino)ethyl methacrylate, 2-(t-butylamino)ethyl methacrylate, and combinations thereof. In various embodiments, the amine-containing monomer is selected from the group consisting of 2-(diethylamino)ethyl methacrylate, 2-(dimethylamino)ethyl methacrylate, 2-(t-butylamino)ethyl methacrylate, and mixtures of two or more thereof.

Alpha-olefin monomers suitable for use in preparing the amine-functionalized interpolymer can be any α-olefin known or hereafter discovered in the art for preparing α-olefin-based polymers. As it pertains to the amine-functionalized interpolymer, the term "α-olefin" shall include ethylene. Examples of such monomers include, but are not limited to, ethylene, or any $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. In various embodiments, the α-olefin monomer employed in preparing the amine-functionalized interpolymer is ethylene.

In one or more embodiments, the amine-containing interpolymer is an ethylene/aminoacrylate copolymer. In further embodiments, the ethylene/aminoacrylate can comprise a copolymer of low-density polyethylene either copolymerized or grafted with an aminoacryalte monomer, such as those described above (e.g., 2-(diethylamino)ethyl methacrylate, 2-(dimethylamino)ethyl methacrylate, 2-(t-butylamino)ethyl methacrylate, and mixtures of two or more thereof).

Preparation of the amine-functionalized interpolymer can be accomplished by any known or hereafter discovered methods in the art, including copolymerization and grafting techniques. An example of a suitable preparation technique is provided in the Examples section, below.

In various embodiments, it is contemplated that the above-described ethylene-based polymer and the amine-containing interpolymer can be prepared simultaneously. For example, in a reactor where the ethylene-based polymer is being prepared, the amine-containing monomer can be fed into the reactor to either copolymerize with a portion of the monomers used in preparing the ethylene-based polymer or graft with a portion of formed ethylene-based polymer. Thus, in various embodiments, the above-described ethylene-based polymer and the amine-containing interpolymer can be a single component (i.e., an ethylene-based amine-containing interpolymer). In these embodiments, the crosslinkable polymeric composition can be a two-component-based system comprising the ethylene-based amine-functionalized interpolymer and an organic peroxide.

The amount of amine-containing monomer employed in preparing the amine-functionalized interpolymer is not particularly limited and can be varied according to need. In various embodiments, however, the amount of amine-containing monomer employed in preparing the amine-functionalized interpolymer can range from 0.1 to 20 wt %, from 0.5 to 10 wt %, from 1 to 5 wt %, or from 1 to 2 wt %, based on the combined weight of all amine-containing monomers and olefin-type monomers employed in preparing the amine-functionalized interpolymer. In embodiments where the ethylene-based polymer is also the amine-functionalized interpolymer, the amount of amine-containing monomer employed can range from 25 ppm to 2 wt %, or from 25 ppm to 100 ppm, based on the entire weight of the ethylene-based amine-functionalized interpolymer.

In various embodiments, the crosslinkable polymeric composition can comprise the ethylene-based polymer in an amount ranging from 50 to 99 wt %, from 80 to 99 wt %, from 90 to 99 wt %, or from 95 to 99 wt %, based on the entire crosslinkable polymeric composition weight. Additionally, the crosslinkable polymeric composition can comprise the organic peroxide in an amount ranging from 0.1 to 5 wt %, from 0.1 to 3 wt %, from 0.4 to 2 wt %, from 0.4 to 1.7 wt %, from 0.5 to 1.4 wt %, or from 0.7 to less than 1.0 wt %, based on the entire crosslinkable polymeric composition weight.

In various embodiments, the amine-functionalized interpolymer can be present in the crosslinkable polymeric composition in an amount sufficient to result in an amine-functionalization equivalent in the range of from 25 parts per million ("ppm") up to approximately 100 ppm based on the entire weight of the crosslinkable polymeric composition. As an example for clarity, an amine-functionalized interpolymer with 2 wt % aminoacrylate functionalization, which is utilized in a polymeric composition at 0.5 wt % would yield (2 wt %×0.5 wt %) 100 ppm of equivalent amine-functionalization.

Additionally, the amine-functionalized interpolymer can be present in the crosslinkable polymeric composition in an amount ranging from 0.1 to 5 wt %, from 0.2 to 2 wt %, or from 0.4 to 0.6 wt %, based on the entire weight of the crosslinkable polymeric composition. Of course, the desired concentration of the amine-functionalized interpolymer will vary depending on the degree of amine-functionalization in the interpolymer. Amine-functionalized interpolymers having low amine content (e.g., 0.1 wt % of the interpolymer) may be used in higher concentrations to achieve the desired amine-functionalization equivalent in the overall crosslinkable polymer composition. On the other hand, amine-functionalized interpolymers having high amine content may be used in lower concentrations.

In other embodiments, when the amine-functionalized interpolymer and the ethylene-based polymer are prepared together, the resulting ethylene-based amine-functionalized interpolymer can be present in an amount ranging from 1 to 99 wt %, from 50 to 99 wt %, from 80 to 99 wt %, from 90 to 99 wt %, or from 95 to 99 wt %, based on the entire crosslinkable polymeric composition weight.

In still other embodiments, based on a molar amine content per gram of crosslinkable polymeric composition, the amine-functionalized interpolymer (whether present as an individual component or as an ethylene-based amine-functionalized interpolymer) can be present in an amount sufficient to yield a molar amine content of 0.1 to 200 micromoles of amine per gram of crosslinkable polymeric composition, from 0.1 to 100 micromoles of amine per gram of crosslinkable polymeric composition, from 0.1 to 6 micromoles of amine per gram of crosslinkable polymeric composition, from 0.2 to 2.5 micromoles of amine per gram of crosslinkable polymeric composition, or from 0.5 to 0.7 micromoles of amine per gram of crosslinkable polymeric composition.

In addition to the components described above, the crosslinkable polymeric composition may also contain one or more additives including, but not limited to, antioxidants, crosslinking coagents, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

In various embodiments, the crosslinkable polymeric composition can comprise one or more antioxidants. Exemplary antioxidants include hindered phenols (e.g., tetrakis [methylene (3,5-di-t-butyl-4-hydroxyhydrocinnamate)] methane), less-hindered phenols, and semi-hindered phenols; phosphates, phosphites, and phosphonites (e.g., tris (2,4-di-t-butylphenyl) phosphate); thio compounds (e.g., distearyl thiodipropionate, dilauryl thiodipropionate); various siloxanes; and various amines (e.g., polymerized 2,2,4-trimethyl-1,2-dihydroquinoline). In various embodiments, the antioxidant is selected from the group consisting of distearyl thiodipropionate, dilauryl thiodipropionate, octadecyl-3,5-di-t-butyl-4-hydroxyhydrocinnamate, benzenepropanoic acid, 3,5-bis(1,1-dimethylethyl)-4-hydroxythiodi-2,1-ethanediyl ester, stearyl 3-(3,5-di-t-butyl-4-hydroxyphenyl) propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis (octylthiomethyl)-o-cresol, 1,3,5-tris(4-tert-butyl-3-hydroxy-2,6-dimethyl benzyl)-1,3,5-triazine-2,4,6-(1H,3H, 5H)-trione, pentaerythritol tetrakis(3-(3,5-di-t-butyl-4-hydroxyphenyl)propionate), 2',3-bis[[3-[3,5-di-tert-butyl-4-hydroxyphenyl] propionyl]]propionohydrazide, and mixtures of two or more thereof. Antioxidants, when present, can be used in amounts ranging from 0.01 to 5 wt %, from 0.01 to 1 wt %, from 0.1 to 5 wt %, from 0.1 to 1 wt %, or from 0.1 to 0.5 wt %, based on the total weight of the crosslinkable polymeric composition.

In various embodiments, the crosslinkable polymeric composition can include one or more crosslinking coagents. Examples of such crosslinking coagents include polyallyl crosslinking coagents, such as triallyl isocyanurate ("TAIC"), triallyl cyanurate ("TAC"), triallyl trimellitate ("TA™"), triallyl orthoformate, pentaerythritol triallyl ether, triallyl citrate, and triallyl aconitate; ethoxylated bisphenol A dimethacrylate; α-methyl styrene dimer ("AMSD"); acrylate-based coagents, such as trimethylolpropane triacrylate ("TMPTA"), trimethylolpropane trimethylacrylate ("TMPTMA"), 1,6-hexanediol diacrylate, pentaerythritol tetraacrylate, dipentaerythritol pentaacrylate, tris(2-hydroxyethyl) isocyanurate triacrylate, and propoxylated glyceryl triacrylate; vinyl-based coagents, such as polybutadiene having a high 1,2-vinyl content, and trivinyl cyclohexane ("TVCH"); and other coagents as described in U.S. Pat. Nos. 5,346,961 and 4,018,852. When employed, the crosslinkable polymeric composition can comprise the crosslinking coagent(s) in an amount ranging from 0 to 3 wt %, from 0.1 to 3 wt %, from 0.5 to 3 wt %, from 0.7 to 3 wt %, from 1.0 to 3 wt %, or from 1.5 to 3 wt %, based on the entire crosslinkable polymeric composition weight.

In various embodiments, the crosslinkable polymeric composition can comprise at least one component that is acidic or that has one or more acidic decomposition products. As mentioned above and discussed in more detail below, it is believed that acidic species in the crosslinkable polymeric composition contribute to degradation of the organic peroxide, and thus loss of cure potential, via acid-catalyzed decomposition. Peroxide degradation in this manner does not result in the radicals that initiate polymer crosslinking and thus result in loss of cure potential. The source of the acidic component can vary greatly and is not particularly limited. However, in various embodiments, the source of the acidic component can be any one or more of the additives described above, such as antioxidants, crosslinking coagents, and processing aids, among others. For example, acidic species can be generated by the oxidation of common stabilizers to yield, for example, sulfur-based, phosphorous-based, or carboxylic acids. In various embodiments, the source of the acidic component can be an antioxidant. In still further embodiments, the source of the acidic component is distearyl dithiopropionate.

Preparation of Crosslinkable Polymeric Composition

Preparation of the cross-linkable polymeric composition can comprise compounding the above-described components. For example, compounding can be performed by either (1) compounding all components into the ethylene-based polymer, or (2) compounding all the components except for the organic peroxide, which can be soaked in as described below. Compounding of the cross-linkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In various embodiments, compounding can be performed at a temperature ranging from 100 to 200° C., or from 110 to 150° C.

Alternatively, in one or more embodiments, the ethylene-based polymer and any optional components can first be melt compounded according to the above-described procedure and pelletized. The amine-functionalized interpolymer can then be added to the pellets, mixed at elevated temperature (e.g., 130° C.), then pressed, cooled, and cut into strips to be extruded at elevated temperature (e.g., 200° C.) and pelletized again. Next, the organic peroxide and the cross-linking coagent, if employed, can be soaked into the resulting ethylene-based polymer compound, either simultaneously or sequentially. In an embodiment, the organic peroxide and optional coagent can be premixed at the temperature above the melting temperature of the organic peroxide and optional coagent, whichever is greater, followed by soaking the ethylene-based polymer compound in the resulting mixture of the organic peroxide and optional cross-linking coagent at a temperature ranging from 30 to 100° C., from 50 to 90° C., or from 60 to 80° C., for a period of time ranging from 1 to 168 hours, from 1 to 24 hours, or from 3 to 12 hours.

The resulting crosslinkable polymeric composition can have increased resistance to loss of cure potential. Though not wishing to be bound by theory, it is believed that the amine functionality imparted to the crosslinkable polymeric composition by the amine-functionalized interpolymer improves retention of the cure potential of the crosslinkable polymeric composition. Essentially, it is believed that the amine functionality inhibits or interferes with the acid-catalyzed decomposition of the peroxide in the crosslinkable polymeric composition, thus preserving cure potential.

In one or more embodiments, the crosslinkable polymeric composition has an initial cure potential ($CP_O$) when crosslinked immediately upon preparation of the crosslinkable polymeric composition, as described in the following Examples, and measured as maximum torque (in-lbs) by moving die rheometer at 182° C. Additionally, the crosslinkable polymeric composition has a heat-aged cure potential $CP_{14}$ when crosslinked after aging the crosslinkable polymeric composition at 70° C. and ambient pressure for 14 days, as described in the following Examples, and measured as maximum torque (in-lbs) by moving die rheometer at 182° C. In various embodiments, the crosslinkable polymeric composition has a ratio of $CP_{14}$ to $CP_0$ of at least 0.1, at least 0.2, at least 0.3, at least 0.4, at least 0.5, at least 0.6, at least 0.7, at least 0.8, or at least 0.9, and up to 1.1, or 1.

In one or more embodiments, the crosslinkable polymeric composition has heat-aged cure potential $CP_{21}$ when crosslinked after aging the crosslinkable polymeric composition at 70° C. and ambient pressure for 21 days, as described in the following Examples, and measured as maximum torque (in-lbs) by moving die rheometer at 182° C. In various embodiments, the crosslinkable polymeric composition has a ratio of $CP_{21}$ to $CP_0$ of at least 0.1, at least 0.2, at least 0.3, at least 0.4, at least 0.5, at least 0.6, at least 0.7, at least 0.8, or at least 0.9, and up to 1.1, or 1.

Crosslinked Polymeric Composition

The above-described crosslinkable polymeric composition can be cured or allowed to cure in order to form a crosslinked ethylene-based polymer. Such curing can be performed by subjecting the crosslinkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the crosslinked polymeric composition can be cooled (e.g., to ambient temperature).

The crosslinking process can create volatile decomposition byproducts in the crosslinked polymeric composition. The term "volatile decomposition products" denotes byproducts formed during the curing step, and possibly during the cooling step, by initiation of the organic peroxide. Such byproducts can comprise alkanes, such as methane. Following crosslinking, the crosslinked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

Coated Conductor

A cable comprising a conductor and an insulation layer can be prepared employing the above-described crosslinkable polymeric composition. "Cable" and "power cable" mean at least one wire or optical fiber within a sheath, e.g., an insulation covering and/or a protective outer jacket. Typically, a cable is two or more wires or optical fibers bound together, usually in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the crosslinkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in crosslinking the crosslinkable polymeric composition and thereby produce a crosslinked polymeric composition. The heated cure zone can be maintained at a temperature in the range of 175 to 260° C. In an embodiment, the heated cure zone is a continuous vulcanization ("CV") tube. In various embodiments, the crosslinked polymeric composition can then be cooled and degassed, as discussed above.

Alternating current cables can be prepared according to the present disclosure, which can be low voltage, medium voltage, high voltage, or extra-high voltage cables. Further, direct current cables can be prepared according to the present disclosure, which can include high or extra-high voltage cables.

Test Methods

Moving Die Rheometer

Perform moving die rheometer ("MDR") testing at 182° C. respectively according to the methods described in ASTM D5289 on an Alpha Technologies MDR 2000. The cure potential is determined using an MDR, which applies an oscillatory strain on a molten sample held at 182° C., while recording the torque. As the compound crosslinks, the torque increases to reach a steady torque maximum, Mh. The comparison of Mh as a function of thermal aging time (at 70° C., for example) provides a means to compare the composition's ability to retain cure potential over long storage times under near-ambient conditions.

Heat Aging

Samples are heat aged in jars sealed with MYLAR™ film under screw-on cap within a laboratory oven at 70° C. Just enough material is removed from the jar after specified aging time for MDR testing, after which the jar is re-sealed and returned to the oven for further heat aging.

Preparation of Crosslinked Plaque Sample for Dissipation Factor Test

A sufficient amount of pelleted compound is compression molded to fill an 8"×8"×0.010" frame. Compression molding is conducted using the following sequence of conditions: i) 3 minutes at 125° C. and 125 psi, ii) 5 minutes at 125° C. and 2500 psi, iii) quench-cool, iv) remove excess flashing, cut into pieces, and continue with additional press-protocol, v) 3 minutes at 125° C. and 500 psi, vi) 3 minutes at 125° C. and 2500 psi, vii) increase temperature to 182° C. and hold 12 minutes at 2500 psi, viii) quench cool.

Dissipation Factor

The 60-Hz dissipation factor is measured on 3-inch discs cut from crosslinked plaques of samples at a temperature of 120° C. and an electrical stress of 25 kV/mm. This is performed by inserting the sample between the flat circular electrodes of a Soken sample holder/test cell Model DAC-OBE-7. The test cell is filled with oil, using Galden D03 Perfluoro Polyether from Solvay Specialty Polymers, which is heated and circulated using a temperature-controlled oil bath. Measurements are taken 1 hour after the sample is inserted to ensure that the system is in thermal equilibrium at the target test temperature. A power supply is used to provide up to 60 Hz 10 kV test voltage. A Soken Automatic Schering Bridge Model DAC-PSC-UA is utilized to measure the dissipation factor with a Soken Model DAC-Cs-102A 1000 pF reference capacitor.

Density

Determine density according to ASTM D792.

Melt Index

Measure melt index, or $I_2$, in accordance with ASTM D1238, condition 190° C./2.16 kg, and report in grams eluted per 10 minutes.

Materials

The following materials are employed in the Examples, below.

The low-density polyethylene ("LDPE") employed has a melt index ($I_2$) of 2 g/10 min., a density of 0.920 g/cm$^3$, and is produced by The Dow Chemical Company, Midland, Mich., USA.

2-(dimethylamino)ethyl methacrylate is commercially available from Sigma Aldrich, St. Louis, Mo., USA.

2-(diethylamino)ethyl methacrylate is commercially available from Sigma Aldrich, St. Louis, Mo., USA.

2-(t-butylamino)ethyl methacrylate is commercially available from Sigma Aldrich, St. Louis, Mo., USA.

Propionaldehyde (97%) is commercially available from Sigma Aldrich, St. Louis, Mo., USA.

Tert-butyl peroxyacetate (50% by weight solution in isododecane) is commercially available from Fisher Scientific, Pittsburgh Pa., USA.

n-Heptane is commercially available from Sigma Aldrich, St. Louis, Mo., USA.

Ethylene monomer is commercially available from Praxair.

Distearyl thiodipropionate ("DSTDP;" antioxidant) is commercially available from Reagens, S.p.A, Bologna, Italy.

Cyanox™ 1790 (tris[(4-tert-butyl-3-hydroxy-2,6-dimethylphenyl)methyl]-1,3,5-triazinane-2,4,6-trione; antioxidant) is commercially available from Cytec Industries, Woodland Park, N.J., USA.

Dicumyl peroxide is commercially available from Arkema Inc.

EXAMPLES

Example 1

Prepare a control ethylene polymer and three ethylene/aminoacrylate copolymers according to the following method.

Undiluted aminoacrylate monomer (either 2-(dimethylamino)ethyl methacrylate, 2-(diethylamino)ethyl methacrylate, or 2-(t-butylamino)ethyl methacrylate) is loaded into a 0.25-L glass supply vessel, which is open to the atmosphere. As the chain transfer agent, a fresh 250-mL bottle of undiluted propionaldehyde (97%) is used as the supply vessel, which is open to the atmosphere. As the initiator, tert-butyl peroxyacetate (2.3 grams of a 50% by weight solution in isododecane) is combined with 500 mL of n-heptane and loaded into a third glass supply vessel. This solution is purged with nitrogen to minimize dissolved oxygen.

For the control sample, inject ethylene at 1,000 gm/hr (35.65 moles/hr), at a pressure of 2,000 bar, into an agitated (2,000 rpm) 54-mL high-pressure continuous stirred tank reactor ("CSTR"), with an external heating jacket set at 187° C. Next, degas the propionaldehyde by an HPLC degasser and then add to the ethylene stream at a pressure of 250 bar and a rate of 3.46 gm/hr (60 millimoles/hr). Then the mixture is compressed to 2,000 bar. The peroxide initiator is added to the ethylene-propionaldehyde mixture at a pressure of 2,000 bar and a rate of $3.2\times10^{-3}$ gm/hr (0.024 millimoles/hr) before the mixture enters the reactor.

The ethylene conversion to polymer is 10.5 wt % based on the mass of ethylene entering the reactor, and the average reaction temperature is 220° C. An ethylene-based polymer having a melt index ($I_2$) of 4.5 g/10 min. is obtained. Approximately 70 grams of ethylene-based polymer is collected.

For the ethylene/aminoacrylate samples, undiluted aminoacrylate monomer is pumped at a pressure of 250 bar and a rate of 1.84 gm/hr (11.7 millimoles/hr) through an HPLC degasser, and then into the propionaldehyde stream, and mixed before the mixture is added to the ethylene stream and compressed to 2,000 bar. The peroxide initiator is added to the ethylene-propionaldehyde-aminoacrylate mixture at a pressure of 2,000 bar and a rate of $4.6\times10^{-3}$ gm/hr (0.036 millimoles/hr), before the mixture enters the reactor.

The ethylene conversion to polymer is 11 wt % based on the mass of ethylene entering the reactor, and the average reaction temperature is 218° C. An ethylene-based polymer having a melt index ($I_2$) of 5 g/10 min is obtained. Approximately 350 grams of ethylene/aminoacrylate polymer is collected.

The comparison above illustrates the method of sample preparation of an ethylene-based amine-functionalized interpolymer useful in the present invention; the addition of the aminoacrylate has little impact on the ethylene conversion or melt index of the resulting polymer.

The following ethylene/aminoacrylate copolymers are obtained according to the above-described procedure:

TABLE 1

Ethylene/Aminoacrylate Copolymer Properties

| Sample Designation | Aminoacrylate Type | Aminoacrylate content (wt %) |
|---|---|---|
| A | 2-(diethylamino)ethyl methacrylate | 1.98 wt % |
| B | 2-(dimethylamino)ethyl methacrylate | 1.66 wt % |
| C | 2-(t-butylamino)ethyl methacrylate | 1.30 wt % |

Example 2

Prepare one comparative sample ("CS1") and three samples ("S1-S3") according to the formulations listed in Table 2, below.

TABLE 2

Compositions of CS1 and S1-S3

| Component (wt %) | CS1 | S1 | S2 | S3 |
|---|---|---|---|---|
| LDPE | 99.63 | 99.13 | 99.13 | 99.13 |
| DSTDP | 0.23 | 0.23 | 0.23 | 0.23 |
| Cyanox ™ 1790 | 0.14 | 0.14 | 0.14 | 0.14 |
| Ethylene/aminoacrylate "A" | — | 0.5 | — | — |
| Ethylene/aminoacrylate "B" | — | — | 0.5 | — |
| Ethylene/aminoacrylate "C" | — | — | — | 0.5 |
| Preblend Total: | 100 | 100 | 100 | 100 |

TABLE 2-continued

Compositions of CS1 and S1-S3

| Component (wt %) | CS1 | S1 | S2 | S3 |
|---|---|---|---|---|
| Peroxide Soak: | | | | |
| Preblend (wt %) | 98.2 | 98.2 | 98.2 | 98.2 |
| Dicumyl Peroxide (wt %) | 1.8 | 1.8 | 1.8 | 1.8 |
| Aminoacrylate Content: | | | | |
| Aminoacrylate content in composition (ppm) | 0 | 100 | 100 | 85 |
| Approximate micromoles of amine groups per gram of composition | 0 | 0.58 | 0.58 | 0.59 |

The sample formulations shown in Table 2 are prepared according to the following procedure. The LDPE, DSTDP and Cyanox 1790 are melt compounded together in a Werner Pfleiderer twin-screw extruder (Model ZSK-30) and then pelletized. A Brabender mixing bowl is then used at 130° C. and 30 rpm to flux the stabilized LDPE. For the samples S1-S3, the ethylene/aminoacrylate copolymer is added to the mixer, and the mixing process is continued for an additional 5 minutes. The resulting compositions are pressed, cooled, and cut into strips to feed into a single-screw extruder. Extrusion is performed at 200° C. melt temperature to form strands that can be pelletized into approximately ⅛" diameter pellets.

Next, the dicumyl peroxide is soaked into the samples as follows. First, 100 g of pellets of the preblend are pre-heated in an oven for 4 hours at 70° C. in 8-oz. glass jars. Molten dicumyl peroxide (~55° C.) is added to the jars. The jars are sealed with a MYLAR™ film under the screw-on lid, and tumbled, returned to the oven for approximately 15 minutes, then tumbled or shaken again to ensure that the pellet surface is dry (indicating the peroxide has been absorbed). The pellets are then allowed to soak overnight in the oven at 70° C.

Samples are removed from the jar to evaluate the cure potential as a function of thermal aging time. The samples are heat aged and their cure potential is determined using a Moving Die Rheometer (MDR) according to the procedures described above. Results of these analyses are provided in Table 3, below.

TABLE 3

Heat-Aged Cure Potential Retention of CS1 and S1-S3 (values listed represent Mh in in-lbs)

| Days at 70° C. | CS1 | S1 | S2 | S3 |
|---|---|---|---|---|
| 0 | 3.19 | 3.17 | 3.19 | 2.66 |
| 4 | 3.25 | 3.36 | 3.25 | 2.66 |
| 7 | 2.66 | 3.36 | 3.39 | 2.72 |
| 13 | 0.16 | 3.39 | 3.28 | 2.73 |
| 21 | (0.16)* | 3.48 | 3.36 | 2.75 |
| 28 | (0.16)* | 3.47 | 2.53 | 2.69 |
| $CP_{13}/CP_0$** | 0.05 | >1 | >1 | >1 |
| $CP_{21}/CP_0$ | 0.05 | >1 | >1 | >1 |

*(inferred value based upon earlier cure measurements, for use in calculation of cure ratio $CP_x/CP_0$)
**Note that $CP_{13}/CP_0$ is used as a reasonable approximation to $CP_{14}/CP_0$ As seen in Table 3, CS1 is found to lose its cure potential between 7 and 13 days of thermal aging at 70° C., which is characteristic of the acid-catalyzed decomposition of the peroxide. However, for S1-S3, the addition of a small amount of amine functionality through the ethylene/aminoacrylate copolymer results in cure potential retention for over 4 weeks. This is a clear indication that the amine functionality within the copolymer is mitigating the acid-catalyzed decomposition of the peroxide.

Example 3

Prepare each of CS1 and S1-S3 for determining dissipation factor according to the following procedure. Each of the samples prepared as described in Example 2 is pressed into a 12-mil plaque and crosslinked as described above. The resulting plaques are stored in a vacuum oven at 60° C. for 4 days to remove volatile byproducts from the crosslinking reaction. 3-inch disks are cut from the plaques and analyzed for dissipation factor according to the above-described Test Methods. Results are provided in Table 4, below.

TABLE 4

Dissipation Factor of CS1 and S1-S3

| | CS1 | S1 | S2 | S3 |
|---|---|---|---|---|
| DF at 120° C. and 25 kV/mm | <0.1% | <0.1% | <0.1% | <0.1% |

In all cases, the samples have a dissipation factor of less than 0.1 percent. This indicates that each one is suitable for use as insulation in high-voltage AC power cables.

Example 4

Prepare three additional Samples (S4-S6) by using a portion of the preblend of CS1 (containing no peroxide) to dilute the preblends of S1 and S2. Perform this dilution on a 2-roll mill (0.4-mm gap, 20 rpm, approximate mix time of 6 minutes, roll temperature of 115° C., during which material is cut from the edges and fed into the center of the roll approximately 10 times) to achieve the formulations in Table 5.

TABLE 5

Compositions of S4-S6

| Component (wt %) | S4 | S5 | S6 |
|---|---|---|---|
| Preblend of CS1 | 50 | 75 | 50 |
| Preblend of S1 | 50 | 25 | — |
| Preblend of S2 | — | — | 50 |
| Preblend Total: | 100 | 100 | 100 |
| Peroxide Soak: | | | |
| Preblend (wt %) | 98.2 | 98.2 | 98.2 |
| Dicumyl Peroxide (wt %) | 1.8 | 1.8 | 1.8 |
| Aminoacrylate Content: | | | |
| Aminoacrylate content in composition (ppm) | 50 | 25 | 50 |
| Approximate micromoles of amine groups per gram of compound | 0.29 | 0.15 | 0.29 |

Milled sheets are then diced into small squares about 0.5 cm in size, and 50 g of the diluted and diced material is inserted into a 16-oz. jar. The dicumyl peroxide is soaked into the samples in a similar fashion as described in Example 2. First, the 50 g of each diced material is pre-heated in an oven for 4 hours at 70° C. in 16-oz. glass jars. Molten dicumyl peroxide (~55° C.) is added to the jars. The jars are sealed with a Mylar™ film under the screw-on lid, and tumbled, returned to the oven for approximately 15 minutes, then tumbled or shaken again to ensure that material surface is dry (indicating the peroxide has been absorbed). The material is then allowed to soak overnight in the oven at 70° C.

Samples are removed from the jar to evaluate the cure potential as a function of thermal aging time. The samples are heat aged and their cure potential is determined using a Moving Die Rheometer (MDR) according to the procedures described above. Results of these analyses are provided in Table 6, below.

TABLE 6

Heat-Aged Cure Potential Retention of S4-S6
(values listed represent Mh in in-lbs)

| Days of Aging at 70° C. | S4 | S5 | S6 |
|---|---|---|---|
| 0 | (2.66)* | 2.50 | 2.66 |
| 4 | 2.66 | 2.54 | 2.65 |
| 7 | 2.63 | 2.56 | 2.66 |
| 14 | 2.56 | 2.56 | 2.70 |
| 21 | 1.46 | 2.59 | 2.70 |
| 28 | 0.25 | 2.49 | 2.07 |
| $CP_{14}/CP_0$ | 0.96 | >1 | >1 |
| $CP_{21}/CP_0$ | 0.55 | >1 | >1 |

(*inferred based upon 4-day measurement . . . actual value not measured).

The magnitude of the initial cure potential for the diluted samples is noticeably lower than that of CS1 and S1-S3. This reduction in initial cure potential is most likely the result of the increased surface area of the larger 16-oz. jar leading to a reduced efficiency of incorporation of peroxide into the flat squares as compared to the pelletized material. Despite this reduction in initial cure potential, an excellent retention of cure potential, as represented by the ratio of $CP_{14}/CP_0$, has been maintained for all of the dilution samples.

Example 5

Prepare one comparative sample ("CS2") and three samples ("S7-S9") according to the formulations listed in Table 7, below.

TABLE 7

Compositions of CS2 and S7-S9

| Component (wt %) | S7 | S8 | S9 | CS2 |
|---|---|---|---|---|
| LDPE | 99.13 | 99.38 | 99.5 | 99.63 |
| DSTDP | 0.23 | 0.23 | 0.23 | 0.23 |
| Cyanox ™ 1790 | 0.14 | 0.14 | 0.14 | 0.14 |
| Ethylene/aminoacrylate "A" | 0.5 | 0.25 | 0.13 | 0 |
| Preblend Total: | 100 | 100 | 100 | 100 |
| Peroxide Soak: | | | | |
| Preblend (wt %) | 98.2 | 98.2 | 98.2 | 98.2 |
| Dicumyl Peroxide (wt %) | 1.8 | 1.8 | 1.8 | 1.8 |
| Aminoacrylate Content: | | | | |
| Aminoacrylate content in composition (ppm) | 100 | 50 | 25 | 0 |
| Approximate micromoles of amine groups per gram of composition | 0.58 | 0.29 | 0.15 | 0 |

The sample formulations shown in Table 7 are prepared according to the following procedure. The LDPE, DSTDP and Cyanox 1790 are melt compounded together in a Brabender mixing bowl at 130° C. and 30 rpm, by first melting the LDPE and then adding the antioxidants, and mixing for 1 minute. The aminoacrylate copolymer is added to the melt in the Brabender mixing bowl and mixing is continued for 5 minutes at 130° C. and 30 rpm. The resulting compositions are pressed, cooled, and cut into strips to feed into a single-screw extruder. Extrusion is performed at 200° C. melt temperature to form strands that can be pelletized into approximately ⅛" diameter pellets.

Next, the dicumyl peroxide is soaked into the samples as follows. First, 100 g of pellets of the preblend are pre-heated in an oven for 4 hours at 70° C. in 8-oz. glass jars. Molten dicumyl peroxide (~55° C.) is added to the jars. The jars are sealed with a Mylar™ film under the screw-on lid, and tumbled, returned to the oven for approximately 15 minutes, then tumbled or shaken again to ensure that the pellet surface is dry (indicating the peroxide has been absorbed). The pellets are then allowed to soak overnight in the oven at 70° C.

Samples are removed from the jar to evaluate the cure potential as a function of thermal aging time. The samples are heat aged and their cure potential is determined using a Moving Die Rheometer (MDR) according to the procedures described above. Results of these analyses are provided in Table 8, below.

TABLE 8

Heat-Aged Cure Potential Retention of CS2 and
S7-S9 (values listed represent Mh in in-lbs)

| Days at 70° C. | S7 | S8 | S9 | CS2 |
|---|---|---|---|---|
| 0 | 3.12 | 3.28 | 3.23 | 3.30 |
| 4 | 3.23 | 3.30 | 3.21 | 3.21 |
| 7 | 3.23 | 3.33 | 3.20 | 3.26 |
| 14 | 3.24 | 3.37 | 3.24 | 1.87 |
| 21 | 3.25 | 3.44 | 1.86 | 0.17 |
| 28 | 3.25 | 2.47 | 0.17 | 0.17 |
| $CP_{14}/CP_0$ | >1 | >1 | >1 | 0.57 |
| $CP_{21}/CP_0$ | >1 | >1 | 0.58 | 0.05 |

The revised dilution scheme of samples S7-S9 and CS2, more similar to the preparation of samples CS1 and S1-S3, yields a more reproducible initial torque (as compared to Table 3). Here, a consistent trend has been established in the effectiveness of the amine functionality to preserve the cure potential of the composition. The retention of the cure potential based upon 14 days of heat aging has been maintained with as little as 25 ppm of aminoacrylate or an equivalent of 0.15 micromoles of amine.

The invention claimed is:
1. A crosslinkable polymeric composition, consisting of:
(a) an ethylene-based amine-functionalized interpolymer having incorporated therein at least one type of amine-containing monomer, wherein said ethylene-based amine-functionalized interpolymer comprises an ethylene/aminoacrylate copolymer, wherein said ethylene/aminoacrylate copolymer comprises a copolymer of low-density polyethylene grafted with an aminoacrylate monomer selected from the group consisting of 2-(diethylamino)ethyl methacrylate, 2-(t-butylamino) ethyl methacrylate, and mixtures thereof;
(b) an organic peroxide; and
(c) optionally, one or more additives;
wherein said ethylene-based amine-functionalized interpolymer is present in an amount ranging from 80 to 99 weight percent, based on the entire crosslinkable polymeric composition weight;

wherein said organic peroxide is present in an amount ranging from 0.1 to 5 weight percent, based on the entire crosslinkable polymeric composition weight; and wherein said one or more additives are selected from the group consisting of: antioxidants, crosslinking coagents, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators;

wherein the crosslinkable polymeric composition has an initial cure potential ($CP_0$) when crosslinked immediately upon preparation of the crosslinkable polymeric composition and measured as maximum torque (in-lbs) by moving die rheometer at 182° C., wherein the crosslinkable polymeric composition has a heat-aged cure potential $CP_{14}$ when crosslinked after aging the crosslinkable polymeric composition at 70° C. and ambient pressure for 14 days and measured as maximum torque (in-lbs) by moving die rheometer at 182° C., and wherein the crosslinkable polymeric composition has a ratio of $CP_{14}$ to $CP_0$ of at least 0.6.

2. The crosslinkable polymeric composition of claim 1, wherein said aminoacrylate monomer is 2-(diethylamino) ethyl methacrylate.

3. The crosslinkable polymeric composition of claim 1, wherein said ethylene-based amine-functionalized interpolymer is present in an amount sufficient to result in a molar amine content in the range of from 0.1 to 200 micromoles of amine per gram of said crosslinkable polymeric composition.

4. The crosslinkable polymeric composition of claim 1, wherein said aminoacrylate monomer is 2-(t-butylamino) ethyl methacrylate.

* * * * *